United States Patent [19]

Morita et al.

[11] Patent Number: 4,924,139
[45] Date of Patent: May 8, 1990

[54] PROJECTION CATHODE-RAY TUBE WITH GREEN EMITTING PHOSPHOR SCREEN

[75] Inventors: Yasukazu Morita, Mobara; Yasuhiko Uehara, Chiba, both of Japan

[73] Assignee: Hitachi, Ltd., Tokyo, Japan

[21] Appl. No.: 209,936

[22] Filed: Jun. 22, 1988

[30] Foreign Application Priority Data

Jun. 22, 1987 [JP] Japan .................. 62-153261

[51] Int. Cl.$^5$ .............................. H01J 29/20
[52] U.S. Cl. ............................ 313/468; 252/301.4 R
[58] Field of Search ............................ 313/467, 468; 252/301.4 R

[56] References Cited

FOREIGN PATENT DOCUMENTS 56-125479 10/1981 Japan .
60-101175 6/1985 Japan .
61-76585 4/1986 Japan .
2149416 12/1985 United Kingdom ......... 252/301.4 R Primary Examiner—Donald J. Yusko
Assistant Examiner—Michael Horabik
Attorney, Agent, or Firm—Antonelli, Terry, Stout & Kraus

[57] ABSTRACT

This invention relates to a phosphor prepared by mixing a green emitting phosphor $InBO_3$:Tb having an excellent color tone with other green emitting phosphors having a short decay time such as $Y_3Al_{5-m}Ga_mO_{12}$:Tb in amounts such that the "decay time to 10% of peak brightness" measured by a raster spot method is below 10 ms. The phosphor screen of a projection cathode-ray tube is formed by use of this phosphor. The projection cathode-ray tube thus produced has an excellent color tone and a short decay time.

9 Claims, 2 Drawing Sheets

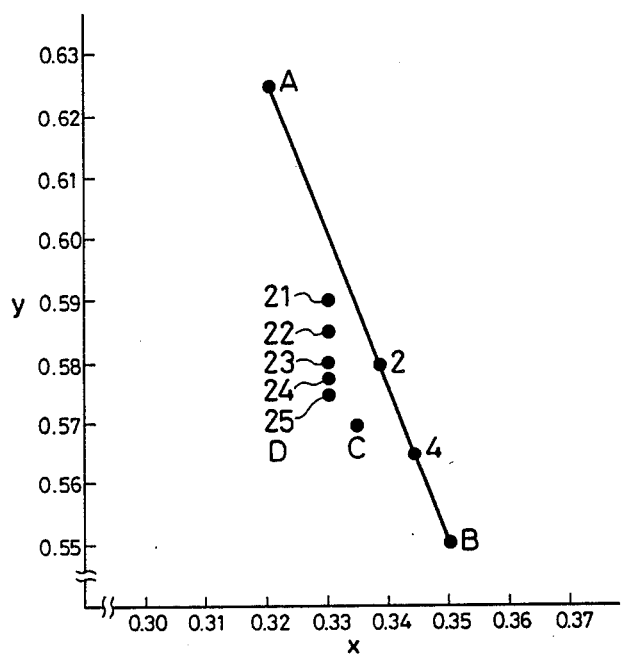

PROJECTION CATHODE-RAY TUBE WITH GREEN EMITTING PHOSPHOR SCREEN

BACKGROUND OF THE INVENTION

This invention relates to a green emitting projection cathode-ray tube of high luminance having an excellent color tone. A color having an excellent color tone represents a color having both excellent hue and excellent saturation. In the CIE chromaticity diagram, the green range lies in the range of $x<0.350$ and $y>0.550$. The term "excellent color tone" means that x is as small as possible below 0.350 while y is as great as possible above 0.550. FIG. 1 of the accompanying drawings is the CIE chromaticity diagram representing the chromaticity of various green emitting phosphors inclusive of the phosphors of the later-appearing embodiments of the present invention. The directions of excellent hue, excellent saturation and excellent color tone are represented by reference numerals 11, 12 and 13, respectively, in the diagram.

An $InBO_3$:Tb (indium borate activated by terbium) phosphor is a green emitting phosphor which can withstand electron beam radiation of a high density large current value, is suitable for a projection cathode ray tube and has an excellent color tone, but has a long decay time. Therefore, in order to use this phosphor for the projection cathode-ray tube in practice, it must be mixed with another phosphor having a short decay time and highly resistant to electron beam burning so as to shorten substantially the decay time.

It is known from the prior art references such as Japanese Patent Laid-Open No. 76585/1986 to use this phosphor by mixing it in such a manner that the decay time value is below 10 ms as measured by raster scanning method. However, when such a green emitting projection cathode-ray tube is mounted actually to a projection television set and evaluated, very gradual decline of delay is so marked that the cathode-ray tube cannot be put into practical application.

The green emitting phosphor described in the prior art reference described above, i.e. Japanese Patent Laid-Open No. 76585/1986, is prepared by adding large amounts of $InBO_3$:Tb to $Y_3Al_5O_{12}$:Tb in order to improve the color tone of $Y_3Al_5O_{12}$:Tb.

It is known, on the other hand, that luminance saturation is not sufficient to use $Y_3Al_5O_{12}$:Tb phosphor for the projection cathode ray tube, and Japanese Patent Laid-Open 101175/1985 instructs, for improving it, that large amounts of Al of $Y_3Al_5O_{12}$:Tb should be substituted by Ga (the molar ratio of Al/Ga being from 0.9/4.1 to 3.3/1.7). Furthermore, Japanese Patent Laid-Open No 125479/1981 discloses a $Y_3(Al,Ga)_5O_{12}$:Tb system green phosphors (the molar ratio of Al/Ga being from 2/3 to 3/2). However, none of these $Y_3(Al,Ga)_5O_{12}$:Tb system green emitting phosphors has entirely satisfactory color tone.

Incidentally, the raster scanning method described above allows the measurement of the decay time in the state that an electron beam of regular intensity scans the phosphor screen and the value of the decay time is stipulated as the decay time to 10% of peak brightness. In this case, an anode voltage is 28 kV, a cathode current is 350 μA, an electron beam diameter is 0.25 mm and a beam scanning rate is 0.2 cm/sec.

As described above, the problem with the $InBO_3$:Tb phosphor is its high value of decay time. The result of the actual evaluation test by the projection tube using the $InBO_3$:Tb phosphor demonstrates that its decay time is longer than that of a green emitting projection tube whose phosphor screen is formed by use of the conventional green emitting phosphors at a 9:1 mixture rate of $Y_3Al_5O_{12}$:Tb and $Zn_2SiO_4$:Mn.

SUMMARY OF THE INVENTION

It is therefore a main object of the present invention to provide a green emitting projection cathode-ray tube of high luminance having an excellent color tone which eliminates the problems with the prior art technique described above and which has improved persistence characteristics.

In order to accomplish the object described above, in the green emitting projection cathoderay tube in accordance with the present invention, the phosphor screen is formed by a mixed phosphor of an $InBO_3$:Tb phosphor having the advantages that it has high luminance and excellent color tone with other green emitting phosphor, said mixed phosphor providing no practical problem in the respect of the persistence characteristics.

More definitely, in the green emitting phosphor used in the present invention, "the decay time to 10% of peak brightness" measured by a raster spot method (hereinafter referred to as the "10% decay time") is set to be below 10 ms. The raster spot method is one of the methods of measuring the persistence characteristics, fixes an electron beam spot to a light emitting position on the phosphor screen for a predetermined time and measures the time before its decay intensity reaches 10% of peak brightness. In this case, an anode voltage is 28 kV, a cathode current is 350 μA, an electron beam diameter is 3 mm (the diameter of the defocussed electron beam spot) and the fixing time of the beam spot is 0.5 sec.

The other green emitting phosphors to be mixed with the $InBO_3$:Tb phosphor are those phosphors whose 10% decay time is 9 ms or below, which have the color tone in the range of $x<0.300$ and $y>0.500$ in the CIE chromaticity diagram, and whose luminance deterioration and saturation are less and better than those of the $InBO_3$:Tb phosphor, respectively.

Examples of other green emitting phosphors to be mixed with $InBO_3$:Tb include $Y_3Al_{5-m}Ga_mO_{12}$:Tb, $Y_2SiO_5$:Tb, LaOCl:Tb and a mixture of $Y_3Al_{5-m}Ga_mO_{12}$:Tb (or $Y_3Al_5O_{12}$:Tb) with $Zn_2SiO_4$:Mn. The m value is $0<m\leq2.27$, more preferably $0<m\leq1.92$, further preferably $1\leq m\leq1.92$ and most preferably $1\leq m\leq1.67$. If Ga somewhat substitutes Al, luminance saturation is improved as much. If the m value is greater than 2.27, luminance deterioration (the drop of luminance after use for an extended period and the measured value relating to the life of the phosphor) becomes undesirably marked.

The amount of other green emitting phosphors represented by $Y_3Al_{5-m}Ga_mO_{12}$:Tb is from about 60 to about 80 wt% with the balance being composed of $InBO_3$:Tb. If the amount of the $Y_3Al_{5-m}Ga_mO_{12}$:Tb phosphor is below 60 wt%, the 10% decay time exceeds 10 ms and if the amount is above 80 wt%, the color tone becomes worse than that of the conventional main green emitting phosphors, so that both the cases are undesirable. Incidentally, the total amount of the other green emitting phosphors is generally more than 60 wt% in order to make the 10% decay time below 10 ms.

$Zn_2SiO_4$:Mn is the phosphor that has the best hue among the green emitting phosphors available at present, and the hue of the green emitting phosphor can be improved by mixing this compound as part of the other green emitting phosphors described above. The CIE chromaticity diagram of the $Zn_2SiO_4$:Mn phosphor shows x=0.215 and y=0.705. Besides long decay time, the $Zn_2SiO_4$:Mn green emitting phosphor exhibits marked luminance deterioration. Therefore, it is not preferable to add this compound in an amount of more than 10 wt% in terms of the total amount of the phosphor mixture.

When the mixture of $Y_3Al_{5-m}Ga_mO_{12}$:Tb and $Zn_2SiO_4$:Mn is used as the other green emitting phosphor, $Y_3Al_{5-m}Ga_mO_{12}$:Tb is at least 55 wt%, $Zn_2SiO_4$:Mn is up to 10 wt%, their total amount is from 60 to 80 wt% and the balance (i.e. from 20 to 40 wt%) is made of $InBO_3$:Tb.

The projection cathode-ray tube whose phosphor screen is composed of the green emitting phosphor having the composition described above has both excellent color tone and excellent persistence characteristics (that is, a short decay time).

Incidentally, the projection cathode-ray tube of the present invention may have the same construction as that of conventional projection cathode-ray tubes except that the phosphor described above is used to form the phosphor screen.

BRIEF DESCRIPTION OF THE DRAWINGS

FIG. 3 is the CIE chromaticity diagram of various green emitting phosphors in another embodiment of the present invention and that of other green emitting phosphors.

DESCRIPTION OF THE PREFERRED EMBODIMENTS

The problem with the conventional projection cathode-ray tube using $InBO_3$:Tb described above is believed to result from the use of the raster scanning method for measuring the decay time of the phosphor screen. Therefore, the following two methods are employed to evaluate the persistence characteristics and to verify experimentally the correlationship with the result of the actual mounting test.

First of all, the raster scanning method allows the measurement of the decay in the state that an electron beam of regular intensity scans the phosphor screen, as described already. In comparison with the case where the cathode-ray tube is mounted to a projection type television set and emits especially strong light, therefore, excitation of the phosphor in the raster scanning method is believed insufficient. For this reason, the present invention employs the afore-mentioned raster spot method for measuring the decay time by fixing an electron beam spot to a light emitting position, as a measuring method for determining the persistence characteristics. In order to evaluate the very gradual decline of decay which is the problem when the cathode-ray tube is mounted to the projection type television set, the present embodiment employs a metronome method in which a small piece of white paper is fitted to the pendulum of a metronome and operated at about 100 cycles per minute, its operation image is picked up by a television camera using an MOS solid state imaging device and projected on the screen of the projection type television set and the persistence characteristics of the white paper image are checked by eyes.

Projection cathode-ray tubes using the phosphors having various mixing ratios are produced tentatively and their values of decay time and the persistence characteristics when mounted actually to a television set are evaluated comparatively by the two methods described above. As a result, it has thus been clarified that if the 10% decay time measured by the raster spot method is determined to be below 10 ms, there can be obtained the projection tubes having desired quality, wherein the persistence characteristics do not render any problem.

Figure 1:
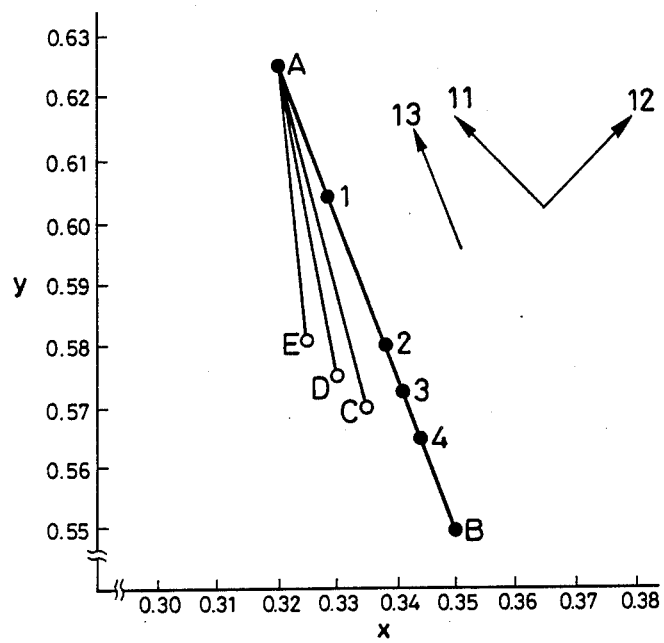
FIG. 1 is the CIE chromaticity diagram of various green emitting phosphors in one embodiment of the present invention and that of other green emitting phosphors.

First, the color tones of the typical green emitting phosphors B, C, D and E that have been used at present in the green emitting projection cathode-ray tube and the color tone of the $InBO_3$:Tb phosphor A employed in the present invention are shown in FIG. 1 by the CIE chromaticity diagram. It can be understood from the diagram that the color tone of $InBO_3$:Tb is better than the color tones of the other green emitting phosphors.

The phosphors B, C, D and E described above have the compositions expressed by $Y_3Al_{3.39}Ga_{1.61}O_{12}$:Tb, a mixture of 90 wt% of $Y_3Al_5O_{12}$:Tb and 10 wt% of $Zn_2SiO_4$:Mn, $Y_2SiO_5$:Tb and LaOCl:Tb, respectively.

EMBODIMENT 1

Projection cathode-ray tubes were produced tentatively by use of phosphors A, 1, 2, 3, 4 and B prepared by mixing an $InBO_3$:Tb phosphor A and the $Y_3Al_{3.39}Ga_{1.61}O_{12}$:Tb phosphor B described above the color tone of which was not very good but the decay time of which was short and which was resistant to electron beam burning, in various mixing ratios (the $InBO_3$:Tb amounts in phosphors A, 1, 2, 3, 4 and B being 100, 75, 40, 30, 20 and 0 wt%, respectively). The persistence characteristics of each tube and the gradual decline of decay of each tube after the tube is mounted actually to a television set were evaluated by the raster spot method and the metronome method described above. FIG. 1 shows the CIE chromaticity diagram of the color tones of the green emitting phosphors 1, 2, 3 and 4 each consisting of the mixture of the phosphors A and B, together with the conventional green emitting phosphors A, B, C, D and E.

The results of measurement are shown in Table 1. It could be understood from these results that if the 10% decay time was below 10 ms, the very gradual decline of decay was not marked and no practical problem developed. It was also found that in the green emitting phosphors consisting of the mixture of $Y_3Al_{3.39}Ga_{1.61}O_{12}$:Tb and $InBO_3$:Tb, the upper limit of the amount of $InBO_3$:Tb was 40 wt% for the 10% decay time to be below 10 ms.

A similar measurement was carried out for each of the phosphors C, D and E. It was found that if the 10% decay time was below 10 ms, there occurred no practical problem in the respect of the persistence characteristics in the same way as described above.

Incidentally, the 10% decay time of $InBO_3$:Tb by the raster spot method was 16 ms as shown in Table 1 but was 3 ms when measured by the raster scanning method. Since this value did not correspond to practicality, the raster scanning method was found unpreferable.

Figure 2:
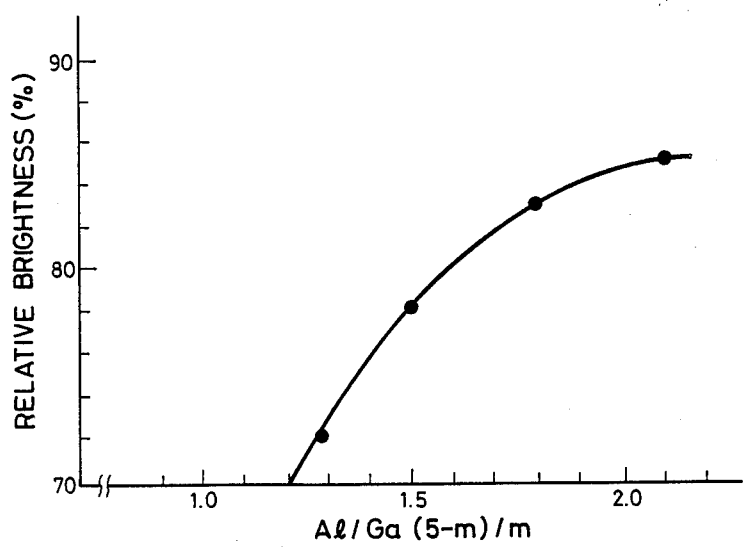
FIG. 2 is a diagram showing the relationship between luminance deterioration of a $Y_3Al_{5-m}Ga_mO_{12}$:Tb green phosphor and the molar ratio of Al/Ga.

In $Y_3Al_{5-m}Ga_mO_{12}$:Tb to be mixed with $InBO_3$:Tb, Ga was added in substitution for Al in order to improve luminance saturation of $Y_3Al_5O_{12}$:Tb. Luminance deterioration was less with a greater ratio of the Al amount to the Ga amount, that is, with a greater ratio $(5-m)/m$. FIG. 2 is a diagram showing the relationship between luminance deterioration of the $Y_3Al_{5-m}Ga_mO_{12}$:Tb phosphor and the ratio $(5-m)/m$. In the diagram, the ordinate represents relative brightness 100 represented in percentage of the proportion of "brightness after irradiation with an electron beam for 2,000 hours" to "brightness at the start of the electron beam irradiation which is set at 100%". In this case, the anode voltage was 30 kV, the cathode current was 550 μA and the raster size was 5 in.

As can be seen clearly from FIG. 2, relative brightness was at least 70% and the tube could be used practically if the molar ratio of the Al amount to the Ga amount, that is, the value $(5-m)/m$, was 1.2 or more (namely m being not more than 2.27). When the $(5-m)/m$ value was at least 1.6 (namely m being up to 1.92), relative brightness was at least 80% and luminance deterioration was extremely less and when it was at least 2.0 (namely m being up to 1.67), luminance deterioration became further less.

TABLE 1

| phosphor | mixing ratio (wt % of InBO$_3$:Tb) | 10% decay time (ms) | markedness of very gradual decline of decay | x/y (CIE chromaticity diagram) |
|---|---|---|---|---|
| A | 100 | 16 | large ( ) | 0.320/0.625 |
| 1 | 75 | 14 | medium ( ) | 0.328/0.605 |
| 2 | 40 | 10 | small (ok) | 0.338/0.580 |
| 3 | 30 | 8 | small (ok) | 0.340/0.573 |
| 4 | 20 | 7 | nil (ok) | 0.343/0.565 |
| B | 0 | 5 | nil (ok) | 0.350/0.550 |

( ): evaluation
and means that practical problem occurs.

EMBODIMENT 2

In this embodiment, a projection cathode-ray tube was produced by applying the phosphor 3 in Example 1 (a mixture of 30 wt% of InBO$_3$:Tb and 70 wt% of $Y_3Al_{3.39}Ga_{1.61}O_{12}$:Tb) to a 7-in valve. The CIE chromaticity diagram values of this projection cathode-ray tube are represented by numeral 3 in FIG. 1, and the decay time and the markedness of very gradual decline of decay are shown in Table 1 as those for phosphor 3. In other words, its color tone was better than that of $Y_3Al_{3.39}Ga_{1.61}O_{12}$:Tb represented by symbol B in FIG. 1 (the color tone changing from the point B in FIG. 1 in a direction 13), and it ensures quality free of problem in both the persistence characteristics and the markedness of very gradual decline of decay. Therefore, the cathode-ray tube of this example is better in the color tone than the cathode-ray tube using $Y_3(Al,Ga)_5O_{12}$:Tb as the phosphor and it did not have any problem in both the persistence characteristics and the markedness of very gradual decline of decay.

EMBODIMENT 3

Since Example 1 represents only the case where $Y_3Al_{5-m}Ga_mO_{12}$:Tb was mixed with InBO$_3$:Tb, this example deals with the cases where the phosphor A, i.e. InBO$_3$:Tb, was mixed with each of the green emitting phosphors C, D and E described above. As a result, the chromaticity diagram of each of phosphors C, D and E moved in the direction of the point A in FIG. 1, where the color tone was high, on each of the lines connecting the point A corresponding to the phosphor A to the points C, D and E. Green emitting projection cathode-ray tubes having the same effect as that of Example 1 could be obtained by use of such phosphors.

EMBODIMENT 4

This example relates to a projection cathode-ray tube using green emitting phosphors prepared by mixing InBO$_3$:Tb with both $Y_3Al_{3.39}Ga_{1.61}O_{12}$:Tb and $Zn_2SiO_4$:Mn.

Phosphors 21, 22, 23, 24 and 25 were prepared by mixing the InBO$_3$:Tb phosphor, the $Y_3Al_{3.39}Ga_{1.61}O_{12}$:Tb phosphor and a $Zn_2SiO_4$:Mn phosphor having the best hue among green phosphors at various mixing ratios, and the projection cathode-ray tube were produced by use of these phosphors. Their CIE chromaticity diagrams and 10% decay time by the raster spot method were measured with a result being shown in Table 2. As to the CIE chromaticity diagrams, FIG. 3 shows them together with the aforementioned phosphors A, B, C, D, 2 and 4.

It can be seen obviously from Table 2 that the 10% decay time of the phosphor 21 in which the amount of InBO$_3$:Tb was more than 40 wt% was above 10 ms and was found unpreferable.

Incidentally, the InBO$_3$:Tb amount of the phosphor 25 was less than 20 wt% and was out of the range of the present invention. Though the color tone of this phosphor was the lowest, its persistence characteristics were good. Therefore, this phosphor could be used practically.

The 10% decay time of the green emitting phosphors 22, 23 and 24 of this embodiment was below .10 ms and their persistence characteristics were satisfactory. As can be seen from FIG. 3, their color tones were high, too, and the chromaticity diagrams were distributed particularly in the direction having the high hue (the direction 11 in FIG. 1).

Though the hue of the phosphors 2, 3 and 4 of Example 1 were lower than that of the phosphors 22, 23 and 24 of this example, their chromaticity diagrams were distributed in the direction having better saturation (the direction 12 in FIG. 1) than the conventional phosphors and they were excellent in saturation.

TABLE 2

| phosphor | InBO$_3$Tb (wt %) | $Y_3Al_{3.39}Ga_{1.61}O_{12}$:Tb (wt %) | $Zn_2SiO_4$:Mn (wt %) | CIE chromaticity diagram (x/y) | 10% decay time (ms) |
|---|---|---|---|---|---|
| 21 | 44 | 55 | 1 | 0.330/0.590 | 10.5 |
| 22 | 37 | 60 | 3 | 0.330/0.585 | 10.0 |
| 23 | 30 | 65 | 5 | 0.330/0.580 | 9.0 |
| 24 | 22 | 70 | 8 | 0.330/0.578 | 8.5 |
| 25 | 15 | 75 | 10 | 0.330/0.575 | 8.0 |

EMBODIMENT 5

In this example, a projection cathode-ray tube was produced by applying the phosphor 23 in Example 4

(the mixture of 30 wt% $InBO_3$:Tb, 65 wt% of $Y_3Al_{3.39}Ga_{1.61}O_{12}$:Tb and 5 wt% of $Zn_2SiO_4$:Mn) to a 7-in valve The CIE chromaticity diagram of this projection cathode-ray tube is represented by numeral 23 in FIG. 3 and its persistence characteristics are represented by the value of the phosphor 23 in Table 2. In other words, its tone color was better than that of the cathode-ray tubes using $Y_3Al_{3.39}Ga_{1.61}O_{12}$:Tb represented by B in FIG. 3, the mixture of 90 wt% $Y_3Al_5O_{12}$:Tb and 10 wt% of $Zn_2SiO_4$:Mn represented by C and $Y_2SiO_5$:Tb represented by D, respectively, and there was no problem in the persistence characteristics. Therefore, no problem occurred in the respect of the markedness of very gradual decline of decay, either.

In accordance with the present invention as described above, a green emitting projection cathode-ray tube having an excellent color tone but not having any problem of persistence characteristics can be obtained by mixing $InBO_3$:Tb having a good color tone with other green emitting phosphors and applying the mixture to the phosphor screen.

What is claimed is:

1. A projection cathode-ray tube wherein its phosphor screen is made of phosphor consisting of 20 to 40 wt% of green emitting phosphor $InBO_3$:Tb, the balance being substantially green emitting phosphor $Y_3Al_{5-m}Ga_mO_{12}$:Tb and the value of m being in the range of $0 < m \leq 2.27$.

2. A projection cathode-ray tube according to claim 1 wherein the value m is in the range of $0 < m \leq 1.92$.

3. A projection cathode-ray tube according to claim 1 wherein the value m is in the range of $1 \leq m \leq 1.92$.

4. A projection cathode-ray tube wherein its phosphor screen is made of a phosphor consisting of 20 to 40 wt% of green emitting phosphor InBO:Tb, the balance being substantially green emitting phosphor $Y_3Al_{5-m}Ga_mO_{12}$:Tb and the value m being in the range of $1 \leq m \leq 1.67$.

5. A projection cathode-ray tube wherein its phosphor screen is made of a phosphor consisting of 20 40 wt% of green emitting phosphor $InBo_3$:Tb, the balance being substantially at least 55 wt% of green emitting phosphor $Y_3Al_{5-m}Ga_mO_{12}$:Tb and up to 10 wt% of $Zn_2SiO_4$:Mn and the value m being in the range of $0 < m \leq 2.27$.

6. A projection cathode-ray tube according to claim 5, wherein the value m is in the range of $0 < m \leq 1.92$.

7. A projection cathode-ray tube according to claim 5, wherein the value m is in the range of $1 \leq m \leq 1.92$.

8. A projection cathode-ray tube wherein its phosphor screen is made of phosphor consisting of 20 to 40 wt% of green emitting phosphor $InBO_3$:Tb, the balance being substantially at least 55 wt% of green emitting phosphor $Y_3Al_{5-m}Ga2mO_{12}$:Tb and up to 10 wt% of $Zn_2SiO_4$:Mn and the value m being in the range of $1 \leq m \leq 1.67$.

9. A projection cathode-ray tube wherein its phosphor screen is made of a phosphor containing at least 60 wt% of at least one green emitting phosphor selected from the group consisting of $Y_2SiO_5$:Tb and LaOCl:Tb, and the balance being substantially composed of green emitting phosphor $InBO_3$:Tb.

* * * * *